Dec. 16, 1969 R. J. MAZIARKA 3,483,646

STORAGE FILE FOR CARDS.

Filed Dec. 8, 1967 3 Sheets-Sheet 1

Inventor:
Robert J. Maziarka
By Hofgren, Wegner,
Allen, Stellman & McCord
Att'ys Dec. 16, 1969 R. J. MAZIARKA 3,483,646

STORAGE FILE FOR CARDS.

Filed Dec. 8, 1967 3 Sheets-Sheet 3

United States Patent Office 3,483,646
Patented Dec. 16, 1969

3,483,646
STORAGE FILE FOR CARDS

Robert J. Maziarka, Niles, Ill., assignor to Alphamatic Corporation

Filed Dec. 8, 1967, Ser. No. 689,160
Int. Cl. G09f 1/10
U.S. Cl. 40—124.2 14 Claims

ABSTRACT OF THE DISCLOSURE

A storage file for holding a plurality of information bearing cards consisting of an extruded peripheral metal frame having at least three parallel slots which receive spaced guides on the sides of each of the pocket forming dividers with laterally extending projections on each of the dividers engaging a portion of the adjacent divider so that the dividers during assembly may be slid down the slots until they engage projections on the adjacent divider.

BACKGROUND OF THE INVENTION

This invention relates generally to storage devices and apparatus for holding information bearing cards, such as route plates conventionally used by the transportation services. These route plates are kept in a file with only the top line of information of the card being exposed (commonly referred to as the key line) so that the person writing a ticket between certain points withdraws the proper route plate from the file on the basis of the information disclosed on the exposed key line and this permits the other information on the card to be covered while in the storage file. The present invention, however, is not limited in use to storing route plates and may be used for storing other information bearing cards as well.

Storage files for holding information bearing cards of the type generally described above have in the past taken the form of a plurality of divider panels arranged in overlapping relation. These divider panels have been affixed to a frame by fastening elements including complicated and expensive hinges. These fastening elements have contributed greatly to the cost of storage files of this character both because of the parts required and the machinery required for fabrication and assembly.

This invention significantly reduces the manufacturing cost for storage files of this general character by reducing the number of parts required and simplifying the assembly thereof.

SUMMARY OF THE INVENTION

In accordance with the present invention a simplified storage file is provided of the type having overlapping panels or dividers defining pockets therebetween which receive the cards to be stored or held. An extruded metal frame surrounds and supports the dividers and has at least three grooves defining inwardly facing tracks. Each of the dividers has two spaced guides integral therewith on each side thereof adapted to be received in two of the tracks in the frame. Thus, during assembly the dividers are inserted in place by sliding them down the tracks in the side frame members until they abut a projection on the adjacent divider already in place. The projections on the dividers are positioned adjacent one of the guides on the sides thereof so that they engage the lower portion of one of the guides on the next divider as it is inserted in place. These projections thus assure that the dividers are stacked one upon the other in the frame rather than nested in intimate contact. In this manner a portion of each divider is exposed and this portion serves to support and permit exposure of the key line on the information bearing card in the associated pocket.

The provision of a plurality of tracks in the frame permits, during assembly, the selection of the pocket width or the transverse spacing between the dividers by selecting different ones of the tracks into which the lower guides on the dividers are to be inserted. Thus, depending upon which track is selected for the lower guide, the dividers will assume a different angular relation with the frame and thus a different spacing from each other. In any one storage file, however, all of the dividers will probably be inserted in the same tracks so that the principal advantage in this construction is in the use of the same extruded frame and dividers for storage files having different pocket sizes.

In addition to the above features a separator wire is provided so that two or even four cards may be held by each divider.

BRIEF DESCRIPTION OF THE DRAWINGS

FIG. 3 is a longitudinal section taken generally along line 3—3 of FIG. 1;

DESCRIPTION OF THE PREFERRED EMBODIMENT

Figure 1:
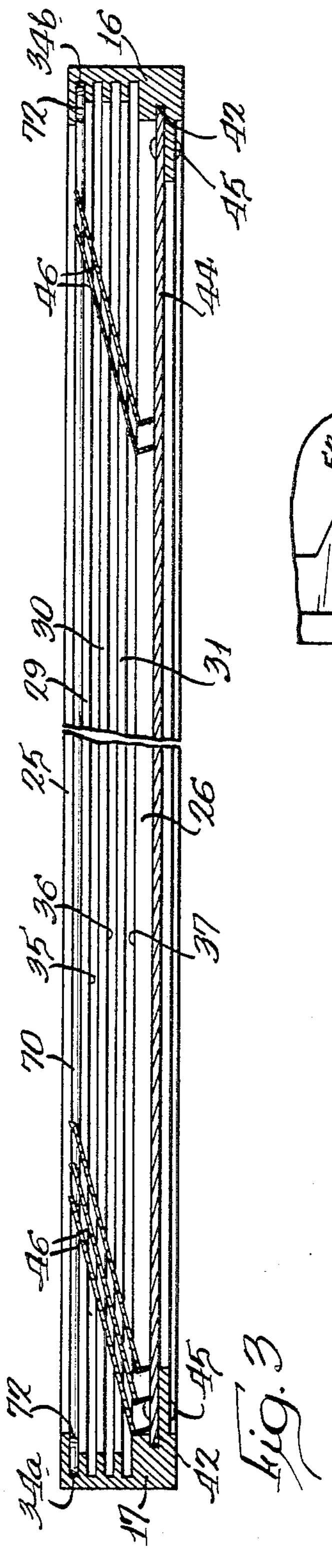
FIG. 1 is a fragmentary view of a storage shelf according to the present invention.

The storage file embodying the present invention is illustrated in the drawings as a drawer 10 adapted to be slid horizontally in and out of a suitable cabinet containing a plurality of the file drawers. The present invention, however, is not limited to a drawer type file and it should be understood that the principles thereof are applicable to other filing arrangements such as vertically supported filing panels hinged at one side to a common base.

As best exemplified in FIGS. 1, 2, 4 and 6 the drawer 10 includes an extruded metal frame having side frame members 14 and 15 and top and bottom frame members 16 and 17, respectively. The frame members are identical in cross section so that it should be understood that the perspective section of frame member 14 in FIG. 6 applies as well to the other frame members 15, 16, and 17.

The frame members 14, 15, 16 and 17 surround each of two drawer units 19 and 20. The units are fastened together by suitable fasteners (not shown) to form a rigid drawer assembly.

Each of the frame members 14, 15, 16 and 17 is an integral metal extrusion having a top flange 25, a heavier bottom flange 26 joined by a web portion 28 having parallel ribs 29, 30 and 31 projecting inwardly therefrom. The ribs and the flanges thereby define an upper first track 34, a second track 35, a third track 36 and a fourth track 37 for receiving the dividers as will appear more clearly hereinbelow.

Figure 6:
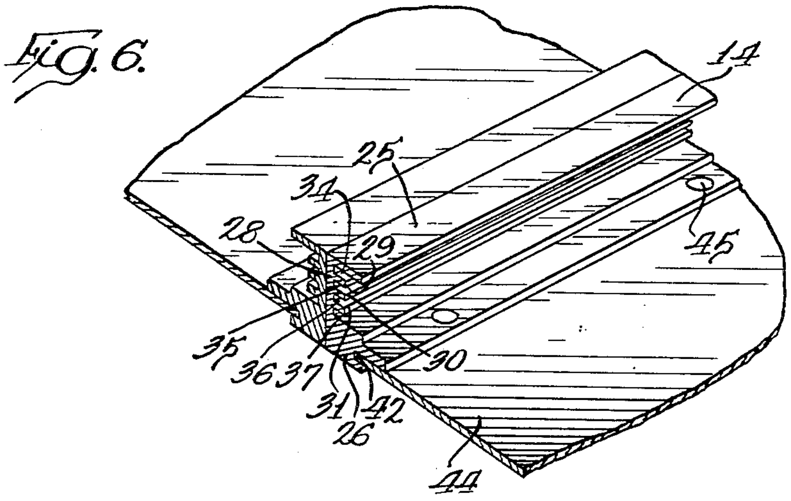
FIG. 6 is a fragmentary view of the central frame members in the shelf of FIG. 1.

As further shown in FIG. 6 with reference to the frame member 14 a recess 42 is formed in the underside of the flanges 26 for the purpose of receiving a back panel 44 which is fastened to the flange by suitable fasteners 45.

For dividing the area bounded by the frame members 14, 15, 16 and 17 into a plurality of card receiving pockets dividers 46 are provided as shown in FIGS. 1, 2, 3 and 4. Each of the dividers are constructed of a single sheet metal stamping and includes an elongated body portion 47 with generally L-shaped side portions 48 and 49.

Extending outwardly from the side portions 48 and 49 are upper tabs or guides 51 and 53 and lower tabs or guides 52 and 54 spaced from the upper tabs. The lower guides 52 and 54 and a portion of the upper tabs 51 and 53 are coplanar with the main body portion 47. A portion of the upper guides 51 and 53 is turned inwardly in a plane generally perpendicular to the main body portion 47 defining projections 56 and 57. A lower portion of the body 47 is turned inwardly in a plane generally perpendicular to the body portion and defines a shelf portion 58 upon which the lower edge of the information bearing card rests. The central portion of the body 47 extends upwardly to the same height as the side portions 48 and 49 and defines a separator support 62 having a recess 63 therein.

During assembly of the drawer 10, with the upper frame member 16 removed the dividers 46 are slid one at a time down two of the selected tracks 34, 35, 36 and 37 with the guides 51, 52, 53 and 54 received in the tracks. The dividers are thus arranged in overlapping relation within the frame members.

Figure 7:
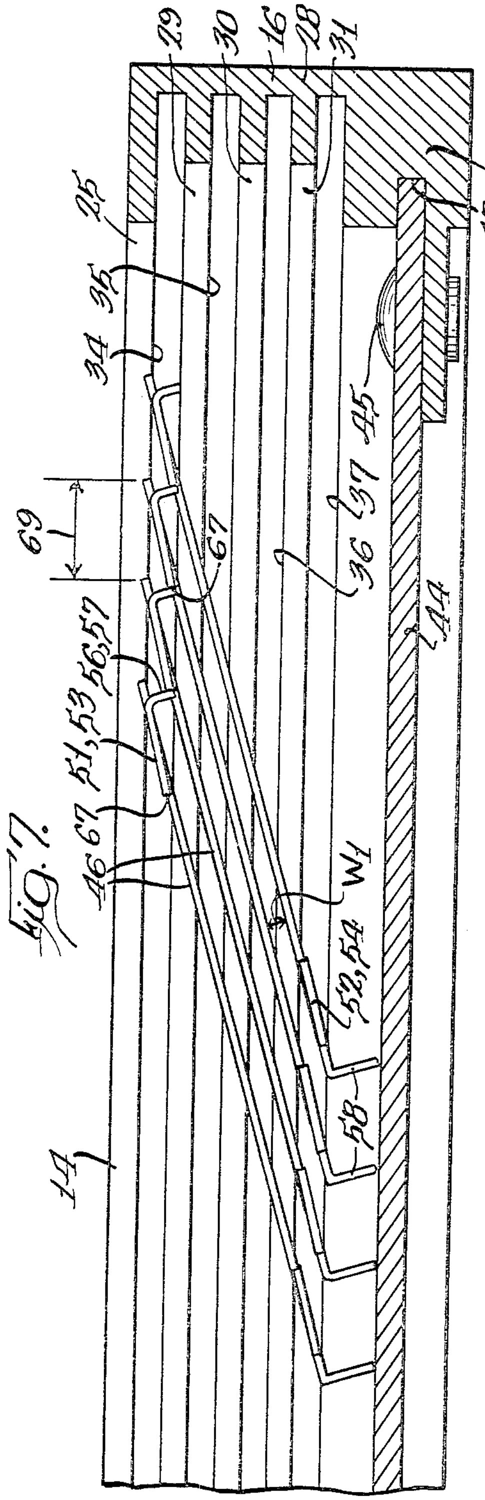
FIG. 7 is an enlarged fragmentary section showing the dividers seated in the frame in positions of maximum spacing.
Figure 8:
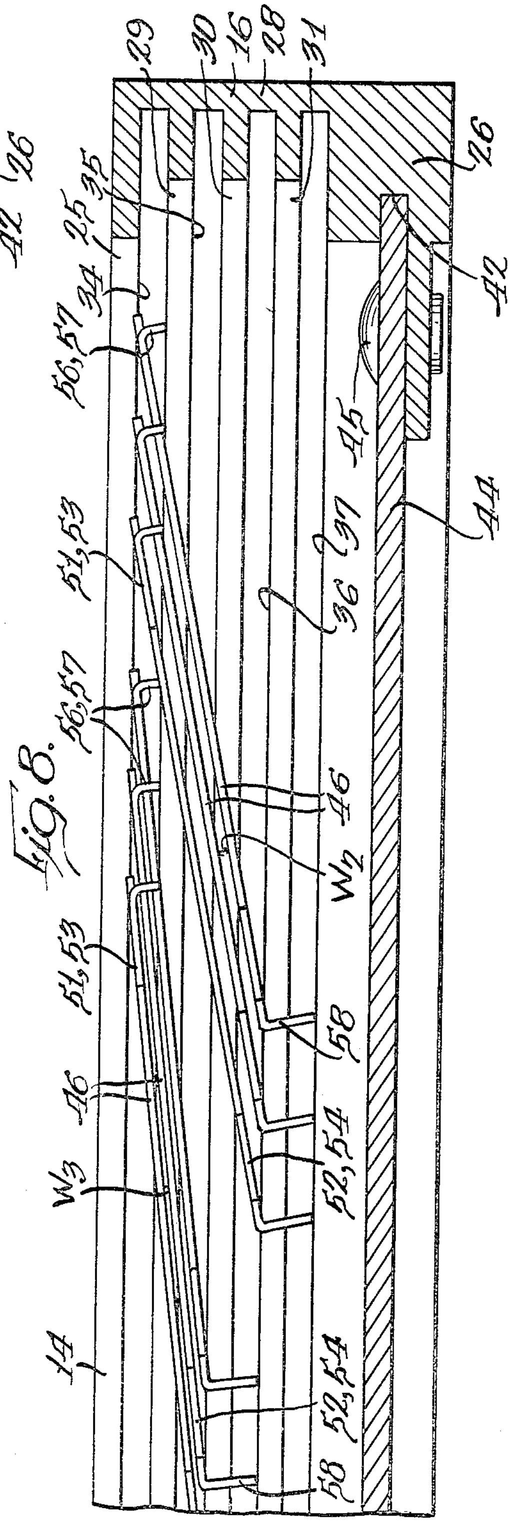
FIG. 8 is an enlarged section similar to FIG. 7 but with the dividers spaced closer together.

As seen more clearly in FIGS. 7 and 8, the four tracks 34 to 37 permit the selection of any one of three pocket widths between the dividers 46 without modifying the dividers 46 or the frame members 14, 15, 16 or 17. To achieve this selectivity the upper guides 51, 53 are always slid down track 34 during assembly but the lower guides 52, 54 may be slid down any of the tracks 35, 36 or 37. When the tabs 52, 54 are received in track 37, as shown in FIG. 7, a maximum pocket width indicated at $W_1$ is achieved while the dividers 46 on the right side of FIG. 8 have their tabs 52, 54 in track 36 to achieve a somewhat narrower pocket width $W_2$. The minimum pocket width is achieved by inserting the lower tabs 52, 54 in track 35 as shown on the left dividers in FIG. 8, the pocket width being indicated $W_3$.

The length of the tabs 51, 52, 53 and 54 is selected to achieve a fairly snug fit when the tabs 52, 54 are in the middle track 36. This may result in some minor bending of the tabs when inserted in the lower slot 37 and some minor looseness of these tabs when inserted in the upper track 35.

While the selection of the desired track 35, 36 or 37 for the tabs 52 and 54 controls the width of the pockets between the dividers, the projections 56 are provided so that the dividers will remain separated and stack rather than nest as they are inserted between the frame members 14 and 15. If they were permitted to nest there would, of course, be no pocket width W. The projections 56 and 57 extend a sufficient distance in a direction perpendicular to the body 47 of the dividers 46 to engage the lower edge 67 of the adjacent divider projections 51 and 53 regardless of the track selection. The distance from the lower edge 67 of guides 51, 53 to the projections 56 determines the key line height indicated at 69 in FIG. 7. This, of course, determines the amount of the card exposed when in storage as well as the number of pockets for a given length storage file.

Thus, it may be seen that with no change in parts storage files may be constructed to accommodate cards of various thicknesses. The narrow pocket width, effected by implementing track 35, may be adopted when a storage file is desired that will frictionally hold the cards in position. This is useful in an inventory control system where the presence or absence of specific goods may be determined by shifting the information bearing card from one side of the divider pockets to the other.

Figure 2:
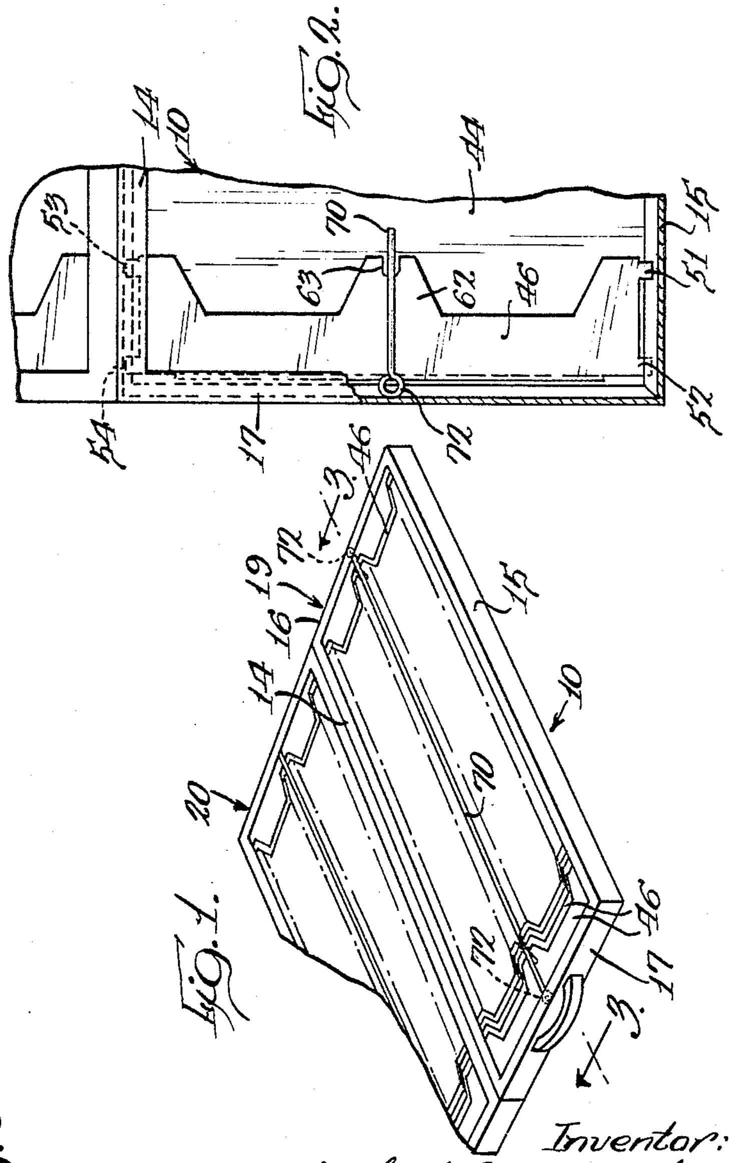
FIG. 2 is a fragmentary section of a portion of a shelf similar to that shown in FIG. 1.

The present storage file is useful for storing a plurality of information bearing cards in each of the pockets. For the purpose of physically separating each pocket to accommodate two or even four cards in each pocket a separator wire 70 is provided as shown in FIGS. 2 and 3. The wire 70 has eyes 72 at both ends thereof received in upper track 34*a* and 34*b* in lower and upper frame members 17 and 16, respectively. The wire 70 engages the recesses 63 in the divider so that the wire effectively divides the pockets between the dividers.

Figures 4, 5:
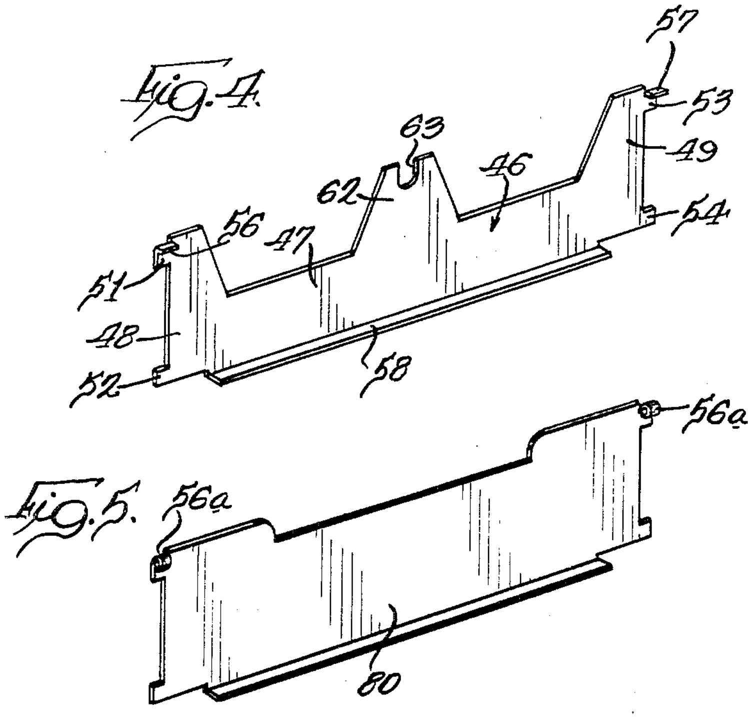
FIG. 4 is a perspective view of one of the dividers illustrated in FIGS. 1 to 3.
FIG. 5 is a perspective view of a divider in modified form.

As shown in the modified divider 80 in FIG. 5 the projections 56, 57 may, instead of the shear form shown in FIG. 4, take the form of a rolled portion 56*a*. This permits somewhat easier sliding of the dividers along the tracks in the side frame members during assembly.

I claim:

1. A filing apparatus for information bearing cards, comprising: frame means, a plurality of generally parallel dividers supported on said frame means in overlapping arrangement, and means on at least one of the dividers engaging an adjacent divider so that the dividers stack rather than nest on each other.

2. A filing apparatus for information bearing cards as defined in claim 1, wherein said means on at least one of the dividers includes a projection at each end of the dividers, one side of the projections on at least one of the dividers engaging the respective opposite side of the adjacent divider projections, whereby the height of the divider stack is determined by the height of the projections.

3. A filing apparatus for information bearing cards as defined in claim 2, wherein said frame means includes two parallel side frame members, means in said frame members for receiving and supporting said projections whereby the projections serve to both space and support the dividers.

4. A filing apparatus for information bearing cards as defined in claim 3 wherein said frame members each has a longitudinally extending track therein, said projections being slidably received in the track associated with the adjacent frame member.

5. A filing apparatus for information bearing cards, comprising: spaced parallel side frame members, first and second tracks in each of said members, dividers supported in said tracks in overlapping relation, each of said dividers having a first guide at each side thereof received in said first track and a second guide at each side thereof received in said second track, and means for determining the amount of overlap of said dividers including a projection on each side of each divider generally aligned with said first guides and extending generally perpendicular to the divider, said projections engaging a lower portion of the adjacent divider first guide means.

6. A filing apparatus for information bearing cards, as defined in claim 1, wherein said means engaging an adjacent divider includes a projection extending from each side of each divider in a direction generally perpendicular to the plane of the divider, said projection being integral with the associated divider and being rolled.

7. A filing apparatus for information bearing cards, comprising: frame means including spaced generally parallel members, first track means in each of said members extending longitudinally thereof, second track means in each of said members generally parallel to said first track means, a plurality of dividers supported on said frame means in overlapping relation each including first guide means slidably received in said first track means, and second guide means slidably received in said second track means, whereby the dividers may be easily assembled on the frame means by sliding them successively down the tracks.

8. A filing apparatus for information bearing cards as defined in claim 7 wherein said first and second frame members are extruded metal, said dividers being sheet metal with the first and second guide means being integral therewith, said guide means being in the plane of the associated divider.

9. A filing apparatus for information bearing cards, comprising: frame means, a plurality of generally planar dividers supported on said frame means in overlapping relation, and a removable separator for adapting the apparatus to cards of varying sizes including a removable member extending perpendicular to the dividers and engaging each of the dividers between the sides thereof to thereby separate each of the pockets formed by adjacent dividers into two pockets.

10. A filing apparatus for information bearing cards as defined in claim 9, wherein said separator member is a wire supported at the ends thereof in the frame means.

11. A filing apparatus for storing information bearing cards, comprising: frame means, a plurality of dividers supported on said frame means in overlapping spaced relation, said dividers being angular with respect to said frame means and defining pockets in which the cards are received, and means for controlling the width of the pockets including means for selectively determining angular relationship between the dividers and the frame means.

12. A filing apparatus for storing information bearing cards as defined in claim 11, wherein said means for selectively determining the angular relationship between the dividers and the frame means includes a plurality of tracks in said frame means, guide means on each of the dividers selectively received in one of the tracks to thereby determine said angular relationship.

13. A filing apparatus for storing information bearing cards as defined in claim 12 wherein said frame means has at least three tracks therein, first guide means on each of said dividers received in one of said tracks, second guide means on each of said dividers selectively received in one of the remaining tracks to thereby determine said angular relationship.

14. A filing apparatus for storing information bearing cards, comprising: frame means including extruded metal parallel side frame members, each of said frame members having at least three parallel tracks therein, a plurality of generally planar sheet metal dividers supported on said frame members in spaced overlapping relationship, each side of each divider having spaced apart first and second guides formed integrally therewith, the first guides being received in one of said tracks and the second guides being selectively reserved in one of the remaining tracks to thereby determine the width of the pockets defined by the dividers, a projection on each side of each divider for determining key line height, said projections extending generally perpendicular to the plane of the divider and being integral therewith, said projections being adjacent said first guides, said projections being positioned to engage the first guides of the adjacent divider, each of said dividers having a turned in portion along the lower part thereof defining the bottoms of the pockets formed by the dividers.

References Cited

UNITED STATES PATENTS

| | | | |
|---|---|---|---|
| 1,365,388 | 1/1921 | Ede | 129—165 |
| 2,112,925 | 4/1938 | Ostler | 40—124 |
| 3,012,348 | 12/1961 | Smith | 40—124 |
| 3,195,254 | 7/1965 | Hurney | 40—124 |

EUGENE R. CAPOZIO, Primary Examiner

W. J. CONTRERAS, Assistant Examiner